United States Patent
Jornod et al.

(10) Patent No.: US 10,839,696 B2
(45) Date of Patent: Nov. 17, 2020

(54) APPARATUSES, METHODS AND COMPUTER PROGRAMS FOR A LOCAL PLATOONING CONTROLLER AND A GLOBAL PLATOONING CONTROLLER, AND A PLATOONING SYSTEM

(71) Applicant: VOLKSWAGEN AG, Wolfsburg (DE)

(72) Inventors: Guillaume Jornod, Berlin (DE); Thorsten Hehn, Wolfsburg (DE); Daniel Reimann, Braunschweig (DE); Roman Alieiev, Stendal (DE)

(73) Assignee: VOLKSWAGEN AG, Wolfsburg (DE)

( * ) Notice: Subject to any disclaimer, the term of this patent is extended or adjusted under 35 U.S.C. 154(b) by 218 days.

(21) Appl. No.: 16/016,708

(22) Filed: Jun. 25, 2018

(65) Prior Publication Data

US 2018/0374367 A1 Dec. 27, 2018

(30) Foreign Application Priority Data

Jun. 23, 2017 (EP) .................... 17177686

(51) Int. Cl.
*G08G 1/00* (2006.01)
*G08G 1/09* (2006.01)
*G05D 1/02* (2020.01)

(52) U.S. Cl.
CPC ............. *G08G 1/22* (2013.01); *G05D 1/0293* (2013.01); *G08G 1/091* (2013.01); *G05D 2201/0213* (2013.01)

(58) Field of Classification Search
CPC ........ G08G 1/22; G08G 1/091; G05D 1/0293; G05D 2201/0213; G05D 1/0291; H04W 4/44
See application file for complete search history.

(56) References Cited

U.S. PATENT DOCUMENTS

2011/0270514 A1* 11/2011 Shida .................. G08G 1/22
 701/117
2014/0180501 A1 6/2014 Kyllmann
2018/0120861 A1* 5/2018 Saxena ................ G05D 1/0295

FOREIGN PATENT DOCUMENTS

DE 102008026686 A1 12/2009
EP 1569183 A2 8/2005
WO 2017022022 A1 2/2017

OTHER PUBLICATIONS

Llatser et al.; Simulation of Cooperative Automated Driving by Bidirectional Coupling of Vehicle and Network Simulators; IEEE Intelligent Vehicles Symposium; 2017.

* cited by examiner

*Primary Examiner* — Nga X Nguyen
(74) *Attorney, Agent, or Firm* — Barnes & Thornburg LLP

(57) ABSTRACT

Apparatuses, methods and computer programs for a local platooning controller and a global platooning controller and a platooning system. The apparatus for a local platooning controller of a transportation vehicle includes a transceiver module which receives information related to a control command from a global platooning controller and transmits feedback information to the global platooning controller. The apparatus includes a control module which controls the transceiver module. The control module determines information related to a deviation between control information received with information related to the control command from the global platooning controller and an actual state of the transportation vehicle, and effects transmission of feedback information based on the information related to the deviation.

13 Claims, 6 Drawing Sheets

APPARATUSES, METHODS AND COMPUTER PROGRAMS FOR A LOCAL PLATOONING CONTROLLER AND A GLOBAL PLATOONING CONTROLLER, AND A PLATOONING SYSTEM

PRIORITY CLAIM

This patent application claims priority to European Patent Application No. 17177686.7, filed 23 Jun. 2017, the disclosure of which is incorporated herein by reference in its entirety.

SUMMARY

Illustrative embodiments relate to apparatuses, methods and computer programs for a local platooning controller and a global platooning controller, and a platooning system, more particularly, but not exclusively, to a concept for adapting a message exchange rate between local and global platooning controllers to balance signalling load and safety.

BRIEF DESCRIPTION OF THE DRAWINGS

The disclosure will be described using the following non-limiting embodiments of apparatuses or methods or computer programs or computer program products by way of example only, and with reference to the accompanying figures, in which.

DETAILED DESCRIPTION

Figure 1:
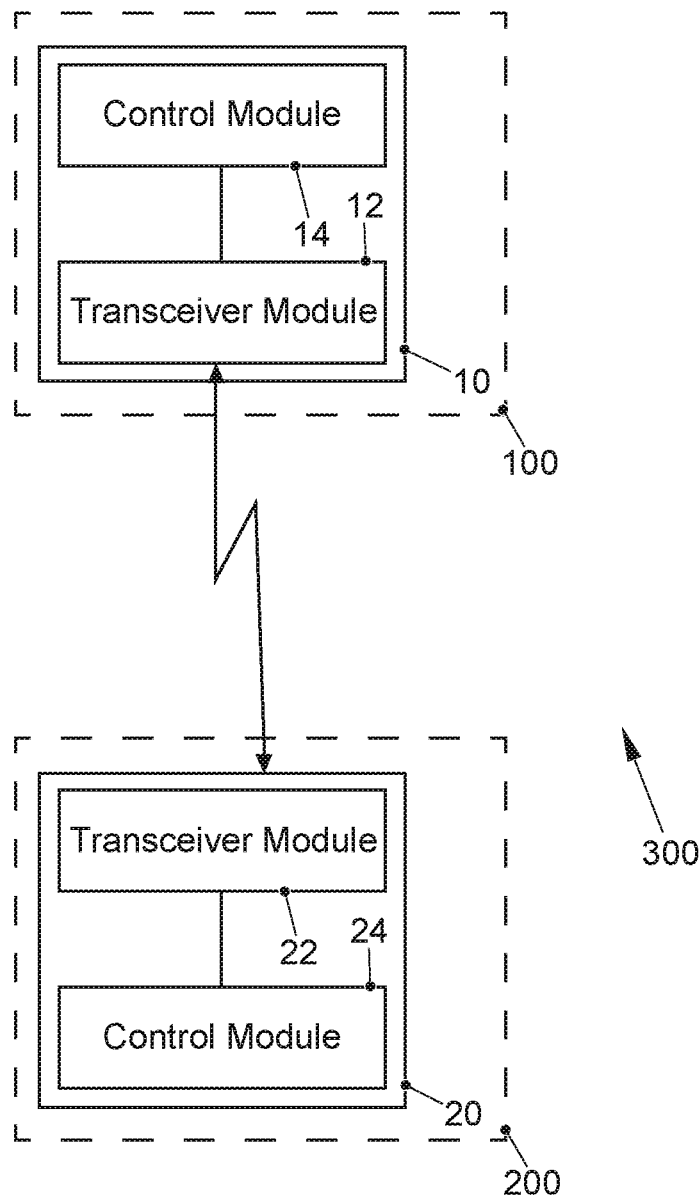
FIG. 1 illustrates an embodiment of an apparatus for a local platooning controller, an embodiment of an apparatus for a global platooning controller, and a system for controlling a platoon.

Automated or autonomous driving is a field of research and development. One concept of dealing with high traffic loads is platooning, in which transportation vehicles are grouped and which may allow making more efficient use of the road capacity. The groups of transportation vehicles, also referred to as convoys or platoons, may be used to operate the transportation vehicles in the platoon with a short distance or headway between the transportation vehicles, as the transportation vehicles within the platoon may react within a short time delay or simultaneously. This can be achieved by control mechanisms being active between the transportation vehicles of the platoon.

For example, in the scope of centralised vehicular platooning, a centralized controller sends commands to the members of the platoons through wireless communications. When it comes to high-density platooning, the inter-vehicle distance is reduced to its minimum. These challenging small headways require the monitoring of global (of the whole platoon) and local performances (of each transportation vehicle in the platoon) to provide a level of responsivity and adaptiveness consistent with this safety critical application.

There is a demand for an improved communication concept for platooning transportation vehicles. The independent claims provide an improved communication concept for platooning transportation vehicles.

Disclosed embodiments are based on the finding that in principle there is open loop control, which does not consume feedback resources on a wireless link at the price of higher safety margins, and there is closed loop control, which consumes more wireless resources for feedback signalling but allows for lower safety margins due to better control loop performance (reaction time, accurateness). On the one hand, open loop control, by essence, might not provide monitoring capabilities. On the other hand, the rate of the feedback and commands communication in a closed loop control can lead to the overload of the wireless channel. Thus, it is a finding of disclosed embodiments that a trade-off can be found between: (i) low feedback frequency that limits the minimisation of the inter-vehicle distance; and (ii) very high frequency that would overload the channel and therefore not meet the quality of service for safety critical applications.

Disclosed embodiments may enable the aforementioned balance by a concept allowing feedback but adapting a rate at which the feedback is provided.

Disclosed embodiments provide an apparatus for a local platooning controller of a transportation vehicle. The apparatus comprises a transceiver module configured to receive information related to a control command from a global platooning controller, and to transmit feedback information to the global platooning controller. The apparatus further comprises a control module configured to control the transceiver module, to determine information related to a deviation between control information received with information related to the control command from the global platooning controller and an actual state of the transportation vehicle, and to effect transmission of feedback information based on the information related to the deviation. Disclosed embodiments may hence enable feedback adaptation based on local deviations of a state of the transportation vehicle from control information provided by a global platooning controller.

Disclosed embodiments also provide an apparatus for a global platooning controller of a transportation vehicle. The apparatus comprises a transceiver module configured to transmit information related to control commands to one or more local platooning controllers, and to receive feedback information from the one or more local platooning controllers. The apparatus further comprises a control module configured to control the transceiver module. The control module is configured to determine information related to an overall signalling load for the one or more local platooning controllers based on the feedback information from the one or more local platooning controllers. The control module is further configured to determine information related to control commands for the one or more local platooning controllers based on the information related to the overall signalling load and based on the feedback information. Disclosed embodiments hence enable an adaptation of command information for the local controllers at the global controller. Hence the signalling load can be adapted to the respective scenario. Disclosed embodiments may hence enable both, a higher signalling load and better control loop performance (lower safety margins) and due to adaptive feedback settings lower signalling load with a similar performance and lower safety margins as the feedback and command provision can be adapted if needed.

At the local controller apparatus the control module may be configured to compare the information related to the deviation to a feedback threshold and to effect transmission of the feedback information if the information related to the deviation indicates a deviation, which exceeds the feedback threshold. Hence, the feedback provision can be adapted to a threshold exceedance and for as long as the deviation does not exceed the threshold feedback at a very low rate or no feedback at all may be provided. For example, the feedback information may comprise information related to a local threshold exceedance of a deviation from a control parameter, which from the perspective of the global controller may be provided by one or more local platooning controllers. At the global platooning controller the control module may be configured to determine the information related to the control commands for one or more local platooning controllers based on the information related to the local threshold exceedance. Hence, the rate of the command information and the command information may be adapted based on indication of the above deviations comprised in the feedback information from the local controllers. For example, the information related to the control command comprises information related to at least one of a speed, an acceleration, a steering or a target inter-vehicle distance command.

For example, the control module of the global controller may be configured to provide information related to a relation between a feedback information transmission rate and deviations between control information provided with the information related to the control commands and an actual state of a local platooning controller to the one or more local platooning controllers. For example, the control module at the local controller may be configured to determine a feedback information transmission rate based on the information related to the deviation. For example, the control module is configured to set the feedback information transmission rate to a first lower rate if the information related to the deviation indicates a first lower deviation, and wherein the control module is configured to set the feedback information transmission rate to a second higher rate if the information related to the deviation indicates a second higher deviation. Hence, in disclosed embodiments the feedback transmission rate can be adapted to the deviation, e.g., a speed deviation from a desired value provided with the command information and an actually measured speed value. Such information related to a relation between the feedback information transmission rate and deviations may be provided by the global platooning controller. In some disclosed embodiments the information related to the relation between the feedback information transmission rate and the deviations from the global platooning controller may comprise multiple thresholds for multiple feedback information transmission rates. Disclosed embodiments may adapt a granularity of the different feedback reporting rates based on the circumstances, e.g., traffic density, wireless capacity, etc.

The global platooning controller may be in control of such reporting rates, e.g., the thresholds may also be adapted. For example, the control module of the apparatus for the global platooning controller may be configured to set the feedback information transmission rate to first lower rate for a first lower deviation, and to set the feedback information transmission rate to second higher rate for a second higher deviation. The feedback information transmission rate and the deviations from the global platooning controller may comprise multiple thresholds for multiple feedback information transmission rates.

Furthermore, in some disclosed embodiments the control module of the global platooning controller may be configured to adapt the transmission of the information related to the control commands to the overall signalling load and to the feedback information. In some disclosed embodiments both criteria may be considered the load of the wireless interface and the deviation at the local controllers. Hence, although the signalling load is high still commands could be sent, and although the signalling load is low no commands may be sent since deviations are low.

Disclosed embodiments also provide a platooning system comprising at least one local platooning apparatus and at least one global platooning apparatus according to the above description. Disclosed embodiments also provide a transportation vehicle comprising the local and/or the global platooning apparatus according to the above description.

Disclosed embodiments also provide a method for a local platooning controller of a transportation vehicle. The method comprises receiving information related to a control command from a global platooning controller, and determining information related to a deviation between control information received with information related to the control command from the global platooning controller and an actual state of the transportation vehicle. The method further comprises effecting transmission of feedback information based on the information related to the deviation.

Disclosed embodiments also provide a method for a global platooning controller of a transportation vehicle. The method comprises transmitting information related to control commands to one or more platooning local controllers, and receiving feedback information from the one or more local platooning controllers. The method comprises determining information related to an overall signalling load for the one or more local platooning controllers based on the feedback information from the one or more local platooning controllers, and determining information related to control commands for the one or more local platooning controllers based on the information related to the overall signalling load and based on the feedback information.

Disclosed embodiments further provide a computer program having a program code for performing one or more of the above described methods, when the computer program is executed on a computer, processor, or programmable hardware component. A further disclosed embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular disclosed embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a disclosed embodiment of an apparatus 10 for a local platooning controller 100 of a transportation vehicle. The apparatus 10 comprises a transceiver module 12 configured to receive information related to a control command from a global platooning controller 200. The transceiver module 12 is also configured to transmit feedback information to the global platooning controller 200. The apparatus 10 further comprises a control module 14, which is coupled to the transceiver module 12, and which is configured to control the transceiver module 12. The control module 14 is further configured to determine information related to a deviation between control information received with information related to the control command from the global platooning controller 200 and an actual state of the transportation vehicle, and to effect transmission of feedback information based on the information related to the deviation. FIG. 1 also illustrates in dotted lines a local platooning controller 100 comprising the apparatus 10.

FIG. 1 further shows a disclosed embodiment of an apparatus 20 for a global platooning controller 200 of a transportation vehicle. The apparatus 20 comprises a transceiver module 22 configured to transmit information related to control commands to one or more local platooning controllers 100, and receive feedback information from the one or more local platooning controllers 100. The apparatus 20 further comprises a control module 24, which is coupled to the transceiver module 22, and which is configured to control the transceiver module 22. The control module 24 is configured to determine information related to an overall signalling load for the one or more local platooning controllers 100 based on the feedback information from the one or more local platooning controllers 100, and to determine information related to control commands for the one or more local platooning controllers 100 based on the information related to the overall signalling load and based on the feedback information. FIG. 1 also illustrates in dotted lines a global platooning controller 200 comprising the apparatus 20.

FIG. 1 also illustrates a platooning system 300 comprising at least one apparatus 10 and at least one apparatus 20 according to the above. Further disclosed embodiments are transportation vehicles comprising a local platooning controller 100, a global platooning controller 200, or both.

In disclosed embodiments the transceiver modules 12, 22 may comprise typical transceiver components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The transceiver module 12, 22 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field, a field array, combinations thereof, etc. In some examples the transceiver modules 12, 22 may serve the purpose of transmitting or receiving or both, transmitting and receiving, information, such as information related to feedback and information related to control commands etc. The transceiver modules 12, 22 can be or comprise one or more interfaces, which may correspond to any method or mechanism for obtaining, receiving, transmitting or providing analog or digital signals or information, e.g., any connector, contact, pin, register, input port, output port, conductor, lane, etc. which allows providing a signal. An interface may be wireless or wireline and it may be configured to communicate, i.e., transmit or receive signals or information with further internal or external components.

In disclosed embodiments, communication, i.e., transmission, reception or both, between the local platooning apparatus 10 and the global platooning apparatus 20 may be carried out using wireless communication. Such communication may use a mobile communication system for such communication. In other words such communication may be carried out directly, e.g., by vehicle-to-vehicle (V2V) communication, which may also be referred to as device-to-device (D2D) communication. Such communication may be carried out using the specifications of a mobile communication system.

The mobile communication system may, for example, correspond to one of the Third Generation Partnership Project (3GPP)-standardized mobile communication networks, where the term mobile communication system is used synonymously to mobile communication network. The mobile or wireless communication system may correspond to a mobile communication system of the 5th Generation (5G) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver can be operable or configured to communicate with one or more active mobile transceivers 100, 200 and a base station transceiver can be located in or adjacent to a coverage area of another base station transceiver, e.g., a macro cell base station transceiver or small cell base station transceiver. Hence, disclosed embodiments may provide a mobile communication system comprising one or more mobile transceivers 100, 200 and one or more base station transceivers, wherein the base station transceivers may establish macro cells or small cells, as e.g., pico-, metro-, or femto cells. A mobile transceiver 100, 200 may correspond to a smartphone, a cell phone, user equipment, a laptop, a notebook, a personal computer, a Personal Digital Assistant (PDA), a Universal Serial Bus (USB)-stick, a car, a transportation vehicle etc. A mobile transceiver 100, 200 may also be referred to as User Equipment (UE) or mobile in line with the 3GPP terminology.

A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver 100, 200. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver 100, 200 can be associated with a base station transceiver or cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some disclosed embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

Mobile transceivers 100, 200 may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V). To do so radio resources are used, e.g., frequency, time, code, and/or spatial resources, which may as well be used for wireless communication with a base station transceiver. The assignment of the radio resources may be controlled by the base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, direct Cellular Vehicle-to-Anything (C-V2X), where V2X includes at least V2V, V2-Infrastructure (V2I), etc., transmission according to 3GPP Release 14 can be managed by infrastructure (so-called mode 3) or run in a User Equipment (UE) Autonomous mode (UEA), (so-called mode 4). The local platooning controller 100 may be comprised in a transportation vehicle or a user equipment. The global platooning controller 200 may also be comprised in a transportation vehicle or user equipment, but at least in some disclosed embodiments it may also be comprised in a base station transceiver.

In disclosed embodiments the control modules 14, 24 may be implemented using one or more processing units, one or more processing devices, any method or mechanism for processing, such as a processor, a computer or a programmable hardware component being operable with accordingly adapted software. In other words, the described functions of the control modules 14, 24 may as well be implemented in software, which is then executed on one or more programmable hardware components. Such hardware components may comprise a general purpose processor, a Digital Signal Processor (DSP), a micro-controller, etc.

Figure 2:
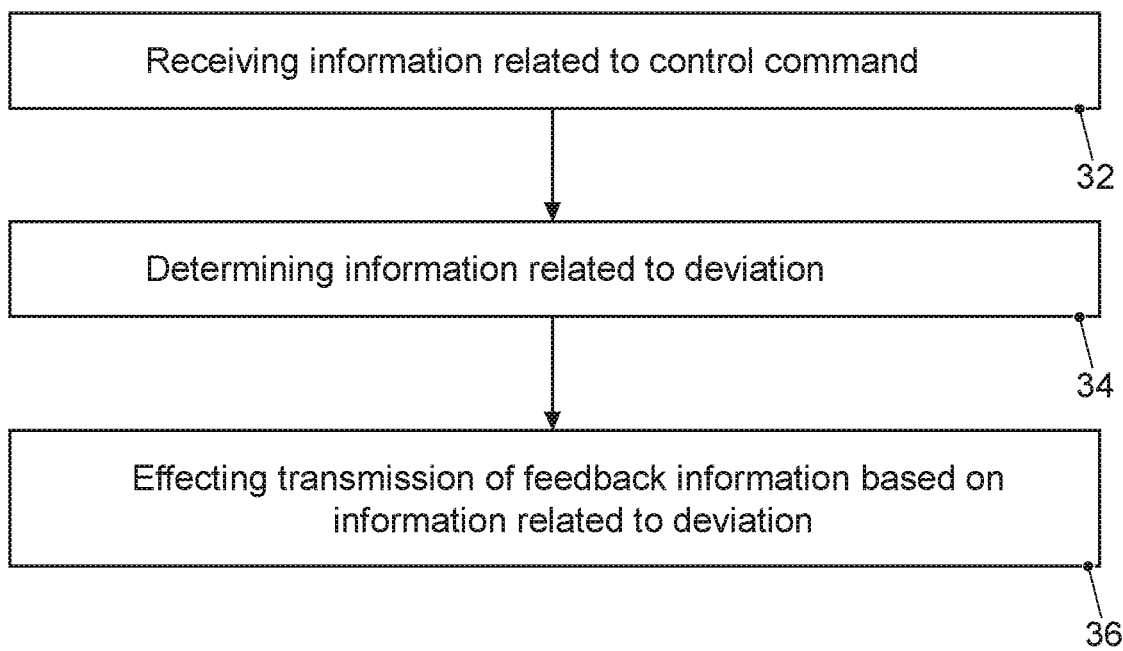
FIG. 2 shows a block diagram of a flow chart of an embodiment of a method for a local platooning controller.

FIG. 2 shows a block diagram of a flow chart of a disclosed embodiment of a method for a local platooning controller 100. The method for the local platooning controller 100 of a transportation vehicle comprises receiving 32 information related to a control command from a global platooning controller 200, and determining 34 information related to a deviation between control information received with information related to the control command from the global platooning controller 200 and an actual state of the transportation vehicle. The method further comprises effecting 36 transmission of feedback information based on the information related to the deviation.

Figure 3:
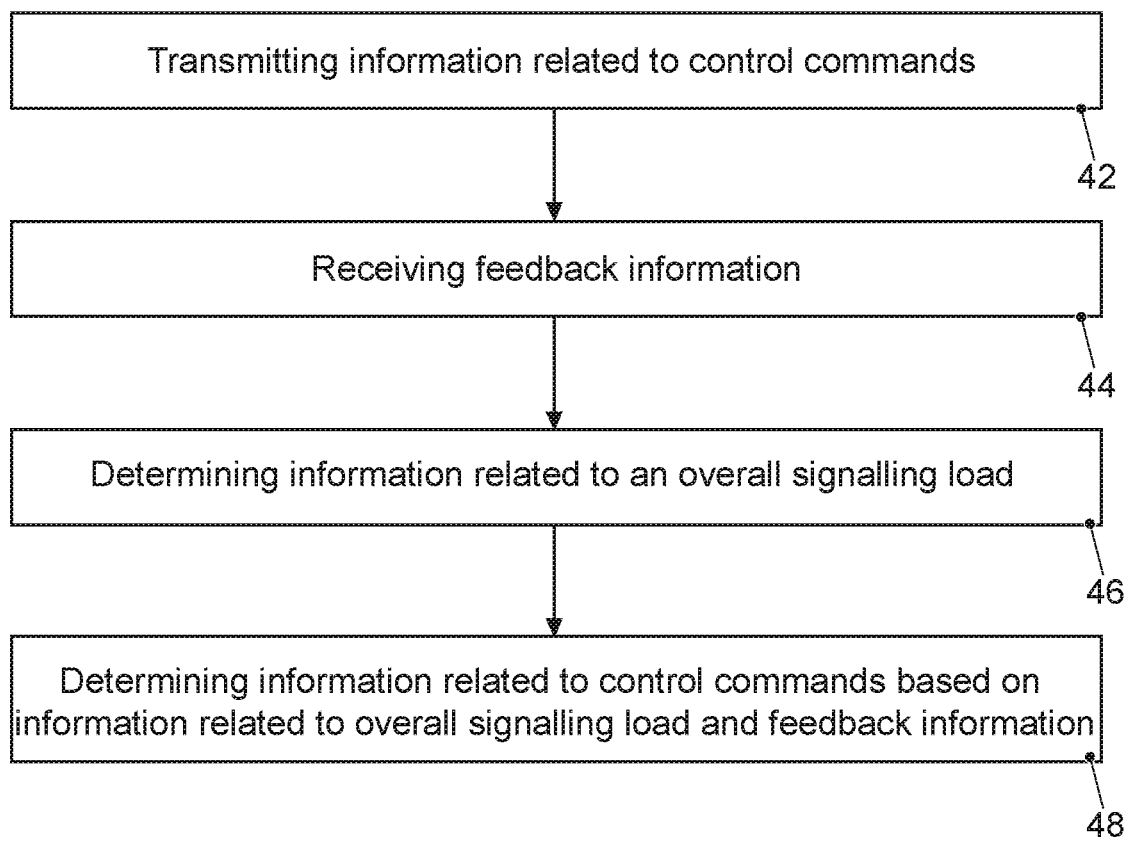
FIG. 3 shows a block diagram of a flow chart of an embodiment of a method for a global platooning controller.

FIG. 3 shows a block diagram of a flow chart of a disclosed embodiment of a method for a global platooning controller. The method for the global platooning controller 200 of a transportation vehicle comprises transmitting 42 information related to control commands to one or more platooning local controllers 100, and receiving 44 feedback information from the one or more local platooning controllers 100. The method further comprises determining 46 information related to an overall signalling load for the one or more local platooning controllers 100 based on the feedback information from the one or more local platooning controllers 100, and determining 48 information related to control commands for the one or more local platooning controllers 100 based on the information related to the overall signalling load and based on the feedback information.

As already mentioned in disclosed embodiments the respective methods may be implemented as computer programs or codes, which can be executed on a respective hardware. Another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

Disclosed embodiments may hence allow adapting a load on the air interface (signalling load) to the circumstances and scenario. Disclosed embodiments may hence still provide benefits of closed loop control. Compared to other concepts, in which settings are usually found by a priori simulations, where platoon relevant metrics are observed when varying the design headway and the feedback period, e.g., Llatser et al., Simulation of Cooperative Automated Driving by Bidirectional Coupling of Vehicle and Network Simulators 2017, IEEE Intelligent Vehicles Symposium, feedback rates can adapt. In the cited reference a distributed leaderless convoy is evaluated in terms of speed, inter transportation vehicle distance and safety rate in emergency braking situation. These metrics are studied with varying convoy size and message period to find a good trade-off for the later. Disclosed embodiments provide an adaptive feedback or signalling rate.

Safety of the platoon may be ensured with a chosen static frequency and target inter-distance transportation vehicle, however, the platoon is designed to cope with the worst-case scenario, i.e., it is most of the time in a sub-optimal setting. Disclosed embodiments may reduce or even minimize a channel load whilst monitoring good/safe operation of the platoon. This performance may be evaluated at two levels, a local one, viz. the agent level of the local platooning controller apparatus 10, and the global one, viz. the platoon level by the global platooning controller apparatus 20. Wireless communication may be needed only at the global level, meaning that with an appropriate design, it is possible to distribute the monitoring tasks between the agents/local controllers 10 and have a load of the channel adapted to the update requirements.

Disclosed embodiments may provide an adaptive method for dynamic feedback and command communication rates. By dividing the operation monitoring at two levels and defining multiple tolerance thresholds, the wireless channel may only be used when required in a safe and efficient manner. In the following multiple disclosed embodiments will be described in more detail. The control module 14 of the local platooning controller apparatus 10 may be configured to compare the information related to the deviation to a feedback threshold and to effect transmission of the feedback information if the information related to the deviation indicates a deviation, which exceeds the feedback threshold. In the following disclosed embodiments with threshold evaluation will be considered. Additionally or alternatively, the control module 14 may be configured to determine a feedback information transmission rate based on the information related to the deviation. The information related to the control command may comprise information related to at least one of a speed, an acceleration, a steering or a target inter-vehicle distance command. Accordingly, the state of the transportation vehicle and the control parameter may be determined by measuring, determining, sensing or setting as desired value speed, acceleration, steering, distance, etc. of the transportation vehicle.

Figure 4:
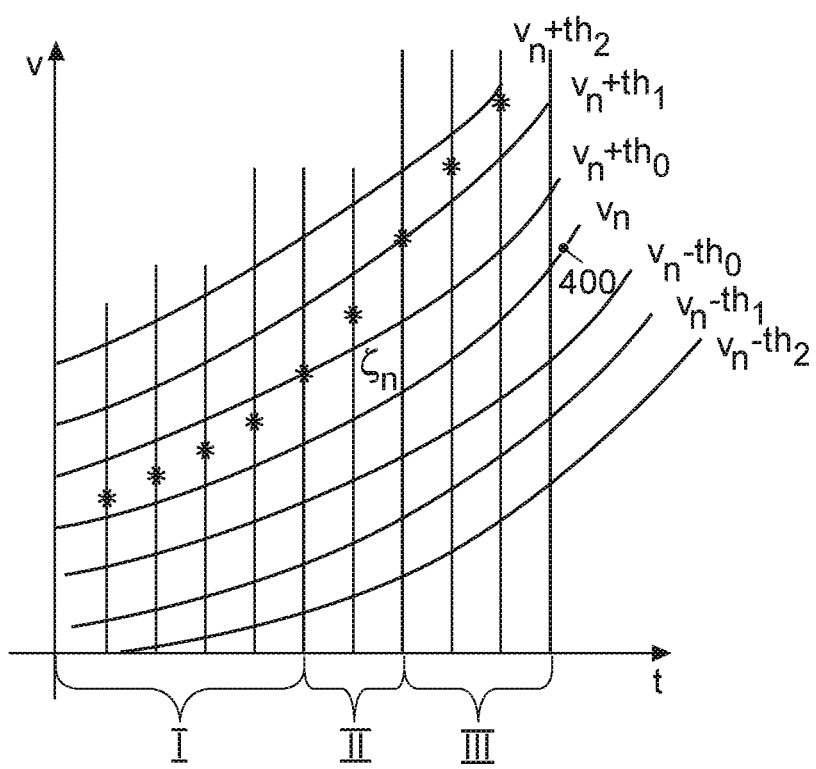
FIG. 4 shows a view chart illustrating an embodiment with two threshold areas.

For example, let vn be a command for agent n under the form of a time-series, $\zeta_n$ be the deviation from the command, $th_i$ with i=0, ..., N, N+1 levels of threshold. Such a disclosed embodiment is illustrated in FIG. 4. FIG. 4 shows a view chart illustrating a disclosed embodiment with two (N=2) threshold areas. The actual commands or desired values are indicated by line 400 and the deviations are indicated by "*". The view chart shows time on the abscissae and a series of speed commands on the ordinate. FIG. 4 shows the commands vn 400 for a transportation vehicle n as they develop over time with respective threshold areas defined by the vn+/−$th_i$ with L=0, ..., N, N+1. These levels of thresholds define different areas around the command vn, where the first one is the normal operation area and the Nth one the ultimate tolerance area. The intermediate thresholds are used to restart the communication cycle so that the global platooning controller 100 gets the threshold infringement warning as soon as possible. The feedback rate can be a function of $\zeta_n$ and $th_0$:

$$f(\zeta_n) = \begin{cases} 0, & \zeta_n < th_0 \\ g(\zeta_n - th_0), & \zeta_n \geq th_0 \end{cases}$$

The control module 14 at the local platooning control apparatus 10 may be configured to determine a feedback information transmission rate based on the information related to the deviation, e.g., by evaluation against the one or more thresholds as shown in FIG. 4. The control module 14 may be further configured to set the feedback information transmission rate to a first lower rate if the information related to the deviation indicates a first lower deviation, and the control module 14 can be configured to set the feedback information transmission rate to a second higher rate if the information related to the deviation indicates a second higher deviation. The control module 24 on the global controller 200 side may be further configured to set the feedback information transmission rate to first lower rate for a first lower deviation, and to set the feedback information transmission rate to second higher rate for a second higher deviation. Hence, the global controller 200 may dynamically/adaptively configure the local controllers 100.

This is indicated by the above equation which starts at rate 0, meaning that for as long as the deviation does not exceed the first threshold no feedback is sent. This is indicated in FIG. 4 by the first time section marked as "I", which can also be referred to a normal operation. All deviations are below the first threshold (first tolerance are). In this disclosed embodiment, no feedback needs to be transmitted. In the subsequent second time section marked as "II" deviations exceed the first threshold and the feedback cycle is started. In FIG. 4 this second tolerance zone is reached at t=5 and the communication cycle is started with the frequency given in the above equation. FIG. 4 further illustrates a third time section marked as "III" in which the ultimate tolerance zone is reached (the second threshold is exceeded) at t=7. The communication cycle is restarted at a higher rate.

The higher the deviation the higher or the more frequent are the feedback transmissions. As indicated by FIG. 4, the feedback information may comprise information related to a local threshold exceedance of a deviation from a control parameter (speed in this example) of the one or more local platooning controllers 100 from the one or more local platooning controllers 10. The control module 24 at the global platooning control apparatus 20 may be configured to determine the information related to the control commands for the one or more local platooning controllers 100 based on the information related to the local threshold exceedance.

A relation between the threshold and the transmission may be set or configured by the global platooning controller

200. The control module 24 can be configured to provide information related to a relation between a feedback information transmission rate and deviations between control information (e.g., desired values) provided with the information related to the control commands and an actual state (e.g., measured, sensed or determined values) of a local platooning controller 100 to the one or more local platooning controllers 100. On the side of the local platooning controller apparatus 10 the control module 14 may be configured to receive information related to a relation between the feedback information transmission rate and deviations from the global platooning controller 200. The information related to the relation between the feedback information transmission rate and the deviations from the global platooning controller 200 may comprise multiple thresholds for multiple feedback information transmission rates.

Figure 5:
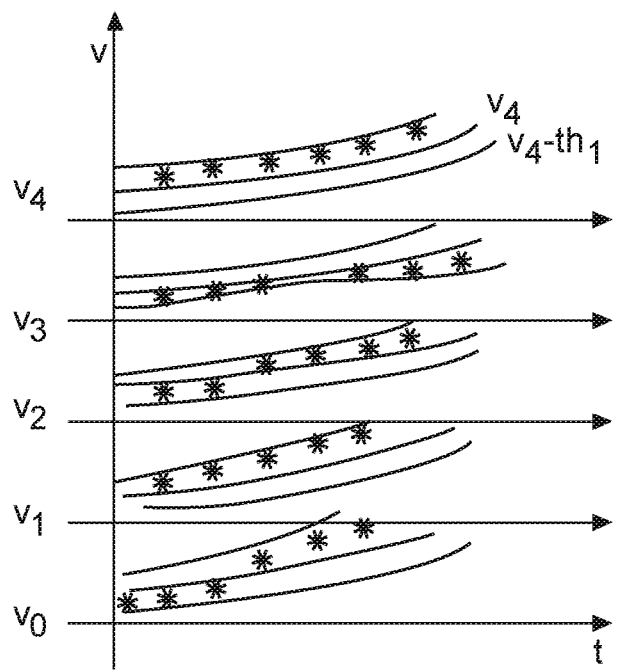
FIG. 5 shows a view chart illustrating local and global threshold deviations in an embodiment.
Figure 5:
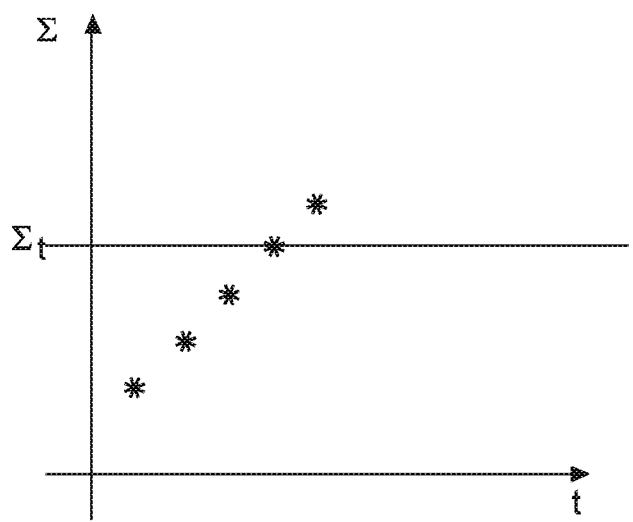

At the global platooning controller apparatus 20 the control module 24 is configured to adapt the transmission of the information related to the control commands to the overall signalling load and to the feedback information. FIG. 5 illustrates a view chart showing local (on the left) and global (on the right) threshold deviations in a disclosed embodiment. FIG. 5 shows threshold configurations and command developments v0, v1, v2, v3, v4 of five transportation vehicles on the left in line with FIG. 4. As can be seen, all deviations are within a tolerance zone, where it is assumed that this is the tolerance zone between the first and second thresholds (second tolerance area defined by th1), i.e., feedback and deviations are provided at a low rate. FIG. 5 shows on the right a cumulated metric of the deviations. Such cumulating is conceivable over time, for example, to develop an integral measure of the deviations, and over the transportation vehicles, to develop cumulated deviations of the platoon at a time. At the global platooning control apparatus 200 the cumulated metric can be evaluated against a threshold, too. This can be carried out in addition to the monitoring of the overall signalling load on the air interface. As shown in FIG. 5 at t=5 the cumulated deviation exceeds the tolerance threshold at the global platooning controller 200 and control commands, local threshold, or the feedback transmission rates can be adapted accordingly.

With g being a select function, for instance, a linear, operation or exponential function. The sequence at the agent level is then:

1. Receive command from platooning controller
2. Input command on local lower level controller
3. Evaluate $\zeta_n$ and $f(\zeta_n)$
4. If $\zeta_n = th_i$, restart communication cycle.
5. Communicate with new rate $f(\zeta_n)$ $th_0$ is chosen to be small enough so that without update from the members of the platoon, the platooning controller has a sufficiently accurate estimate of the state of the agents (it assumes that the member closely follows the command). It can then regularly compute the global performance of the platoon. This is to make sure that although the local agents are in the tolerance area, the global metric, $\Sigma$, of the platoon is still acceptable ($\Sigma < \Sigma_t$), i.e., below its threshold $\Sigma_t$. For instance, if all the agents are performing at the boundary of (but within) the tolerance area, it is highly probable that the platooning is poorly performing (see FIG. 2).

The sequence at the global platooning controller 200 level is then in a disclosed embodiment:

1. Compute and send agents' commands
2. Wait to receive feedbacks
3. Compute $\Sigma$
4. If $\Sigma \geq \Sigma_t$, go to 1
5. If receives a $\Sigma_n \geq th_i$, with $i \in [0,N]$, go to 1
6. Else, go to 2

By setting i=0 and $th_0$ and $\Sigma\_t$ small, classical closed loop control may be obtained. To the contrary, having $th_0$ large, disclosed embodiments may perform close to open loop control, where no feedback is sent. Disclosed embodiments may adapt the feedback rate and performance between these boundaries. In disclosed embodiments the feedback load may be adapted to the level of deviation from the original command whilst the global platooning controller 200 has a recent knowledge of the state of the platoon members 100 and can control the global performance. At least in some disclosed embodiments command updates may only be sent when either a local or a global threshold is crossed or exceeded, cf. FIG. 6. As a result, the wireless channel may only be used when required.

Figure 6:
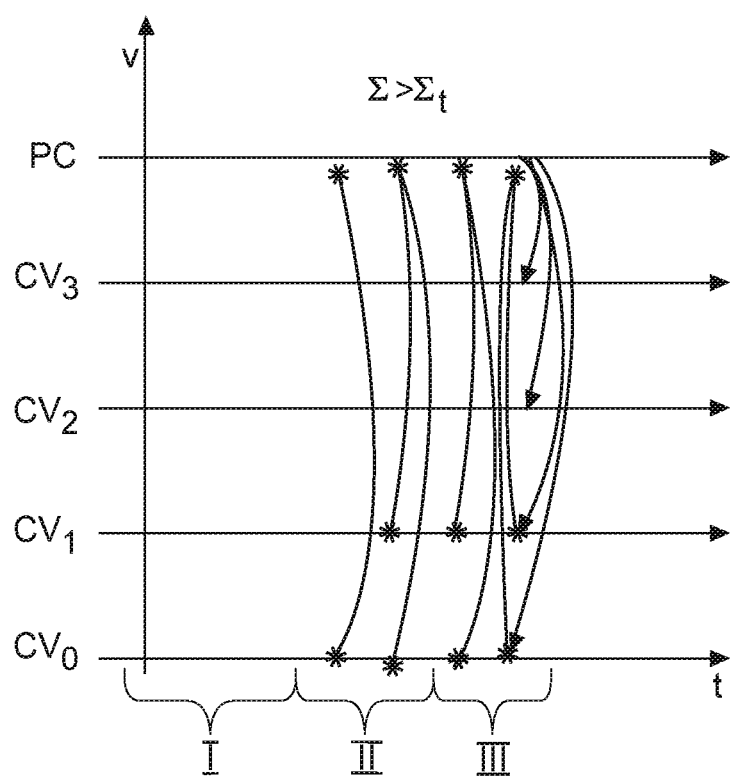
FIG. 6 shows a communication sequence in an embodiment.

FIG. 6 shows a communication sequence in a disclosed embodiment. The sequence over time t illustrates feedback transmissions and command updates in a sequence between 4 local controllers 100 CV0, CV1, CV2, CV3 and a global controller 200 PC. Similar to the scenario in FIG. 1 a first time section "I" defines the situation in which all transportation vehicles are operating within the first tolerance area and no updates are required. The second time section labelled "II" defines the situation in which the local platooning control apparatus 10 of transportation vehicle CV0 detects that it operates in the second tolerance area an transmits feedback to the global controller 200. Shortly after transportation vehicle CV1 detects to be in the same situation. In this situation a command update is not yet required. In the third time section labelled "III" the overall performance (cumulated deviation) of the platoon exceeds a threshold at the global platooning control apparatus 20, which in turn transmits command updates to all transportation vehicles. In some disclosed embodiments command updates might not be transmitted to all transportation vehicles of a platoon but to a selected subset of transportation vehicles, e.g., those which experience the highest deviations. FIG. 6 illustrates how normal operation "I", operations with slight deviations "II" may lead to a global performance issue triggering command updates, "III".

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventors to furthering the art, and are to be construed as being without limitation to such specifically recited examples and conditions. Moreover, all statements herein reciting principles, properties, and disclosed embodiments, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS 10 apparatus for local platooning controller
12 transceiver module
14 control module
20 apparatus for global platooning controller
22 transceiver module
24 control module
32 receiving information related to a control command from a global platooning controller
34 determining information related to a deviation between control information received with information related to the control command from the global platooning controller and an actual state of the transportation vehicle
36 effecting transmission of feedback information based on the information related to the deviation
42 transmitting information related to control commands to one or more platooning local controllers
44 receiving feedback information from the one or more local platooning controllers
46 determining information related to an overall signalling load for the one or more local platooning controllers based on the feedback information from the one or more local platooning controllers
48 determining information related to control commands for the one or more local platooning controllers based on the information related to the overall signalling load and based on the feedback information
100 local platooning controller
200 global platooning controller
300 system
400 commands

The invention claimed is:

1. An apparatus for a local platooning controller of a transportation vehicle, the apparatus comprising:
a transceiver module to:
receive information related to a control command from a global platooning controller; and
transmit feedback information to the global platooning controller; and
a control module to:
control the information communicated by the transceiver module to the global platooning controller by:
determining information related to a deviation between control information received with information related to the control command from the global platooning controller and an actual state of the transportation vehicle; and
effecting transmission of the feedback information to the global platooning controller based on the information related to the deviation;
wherein the control module determines a feedback information transmission rate based on the information related to the deviation and wherein the control module sets the feedback information transmission rate to a first lower rate in response to the information related to the deviation indicating a first lower deviation, and wherein the control module sets the feedback information transmission rate to a second higher rate in response to the information related to the deviation indicating a second higher deviation.

2. The apparatus of claim 1 wherein the control module compares the information related to the deviation to a feedback threshold and to effect transmission of the feedback information in response to the information related to the deviation indicating a deviation, which exceeds the feedback threshold.

3. The apparatus of claim 1 wherein the control module determines the feedback information transmission rate based on the information related to the deviation, and/or wherein the information related to the control command comprises information related to at least one of a speed, acceleration, steering or a target inter-vehicle distance command.

4. The apparatus of claim 1 wherein the control module receives information related to a relation between the feedback information transmission rate and deviations from the global platooning controller.

5. The apparatus of claim 4 wherein the information related to the relation between the feedback information transmission rate and the deviations from the global platooning controller comprises multiple thresholds for multiple feedback information transmission rates.

6. An apparatus for a global platooning controller of a transportation vehicle, the apparatus comprising:
a transceiver module to:
transmit information related to control commands to one or more local platooning controllers; and
receive feedback information from the one or more local platooning controllers; and
a control module to:
control the information communicated by the transceiver module to the global platooning controller by:
determining information related to an overall signalling load for the one or more local platooning controllers based on the feedback information from the one or more local platooning controllers; and
determining information related to control commands for the one or more local platooning controllers based on the information related to the overall signalling load and based on the feedback information;
wherein the control module provides information related to a relation between a feedback information transmission rate and deviations between control information provided with the information related to the control commands and an actual state of a local platooning controller to the one or more local platooning controllers; and
wherein the control module sets the feedback information transmission rate to a first lower rate for a first lower deviation, and wherein the control module sets the feedback information transmission rate to a second higher rate for a second higher deviation, and/or wherein the information related to the relation between the feedback information transmission rate and the deviations from the global platooning controller comprises multiple thresholds for multiple feedback information transmission rates.

7. The apparatus of claim 6 wherein the feedback information comprises information related to a local threshold exceedance of a deviation from a control parameter of the one or more local platooning controllers from the one or more local platooning controllers and wherein the control module determines the information related to the control commands for the one or more local platooning controllers based on the information related to the local threshold exceedance.

8. The apparatus of claim 6 wherein the information related to the control command comprises information related to at least one of a speed, acceleration, steering or a target inter-vehicle distance command.

9. The apparatus of claim 6 wherein the control module adapts the transmission of the information related to the control commands to the overall signalling load and to the feedback information.

10. A platooning system comprising:
at least an apparatus for a local platooning controller of a transportation vehicle including a local platooning transceiver module to receive information related to a control command from a global platooning controller, and transmit local platooning feedback information to the global platooning controller; and a local platooning control module to control the information communicated by the transceiver module to the global platooning controller by, determining information related to a deviation between control information received with information related to the control command from the global platooning controller and an actual state of the transportation vehicle, and effecting transmission of the local platooning feedback information to the global platooning controller based on the information related to the deviation; and
an apparatus for a global platooning controller of a transportation vehicle, the apparatus including a global platooning transceiver module to transmit information related to control commands to one or more local platooning controllers, and receive local platooning feedback information from the one or more local platooning controllers; and
a global platooning control module to control the transceiver module by,
determining information related to an overall signalling load for the one or more local platooning controllers based on the local platooning feedback information from the one or more local platooning controllers; and
determining information related to control commands for the one or more local platooning controllers based on the information related to the overall signalling load and based on the local platooning feedback information;
wherein the local platooning control module determines a feedback information transmission rate based on the information related to the deviation and wherein the local platooning control module sets the feedback information transmission rate to a first lower rate in response to the information related to the deviation indicating a first lower deviation, and wherein the local platooning control module sets the feedback information transmission rate to a second higher rate in response to the information related to the deviation indicating a second higher deviation.

11. A method for a local platooning controller of a transportation vehicle, the method comprising:
receiving, by a transceiver, information related to a control command from a global platooning controller;
transmitting, by the receiver, feedback information to the global platooning controller;
determining, by a control module, information related to a deviation between control information received with information related to the control command from the global platooning controller and an actual state of the transportation vehicle;
effecting transmission of the feedback information based on the information related to the deviation;
determining a feedback information transmission rate based on the information related to the deviation;
setting the feedback information transmission rate to a first lower rate in response to the information related to the deviation indicating a first lower deviation; and
setting the feedback information transmission rate to a second higher rate in response to the information related to the deviation indicating a second higher deviation; and
controlling the transportation vehicle in accordance with the feedback information.

12. A method for a global platooning controller of a transportation vehicle, the method comprising:
transmitting, by a transceiver module, information related to control commands to one or more local platooning controllers;
receiving, by the transceiver module, feedback information from the one or more local platooning controllers;
determining, by a control module, information related to an overall signalling load for the one or more local platooning controllers based on the feedback information from the one or more local platooning controllers; and determining, by the control module, information related to control commands for the one or more local platooning controllers based on the information related to the overall signalling load and based on the feedback information;

providing information related to a relation between a feedback information transmission rate and deviations between control information provided with the information related to the control commands and an actual state of a local platooning controller to the one or more local platooning controllers, and setting the feedback information transmission rate to a first lower rate for a first lower deviation;

setting the feedback information transmission rate to a second higher rate for a second higher deviation, and/or wherein the information related to the relation between the feedback information transmission rate and the deviations from the global platooning controller comprises multiple thresholds for multiple feedback information transmission rates; and controlling the transportation vehicle in accordance with the feedback information.

13. A non-transitory computer readable medium with computer executable instructions stored thereon executed by a processor to perform a method for a local platooning controller of a transportation vehicle, the method comprising:

receiving, by a transceiver, information related to a control command from a global platooning controller;

determining, by a control module, information related to a deviation between control information received with information related to the control command from the global platooning controller and an actual state of the transportation vehicle;

effecting transmission of feedback information based on the information related to the deviation;

determining a feedback information transmission rate based on the information related to the deviation;

setting, by the control module, the feedback information transmission rate to a first lower rate in response to the information related to the deviation indicating a first lower deviation;

setting, by the control module, the feedback information transmission rate to a second higher rate in response to the information related to the deviation indicating a second higher deviation and controlling the transportation vehicle in accordance with the feedback information.

* * * * *